(12) United States Patent
Yasui et al.

(10) Patent No.: US 7,058,492 B1
(45) Date of Patent: Jun. 6, 2006

(54) ROLLING MOTION STABILITY CONTROL APPARATUS FOR A VEHICLE

(75) Inventors: Yoshiyuki Yasui, Nagoya (JP); Toshihisa Kato, Handa (JP); Hiroshi Matsuoka, Toyota (JP); Junya Nagaya, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 11/190,819

(22) Filed: Jul. 28, 2005

(30) Foreign Application Priority Data

Apr. 21, 2005 (JP) ............................. 2005-124103

(51) Int. Cl.
*B60G 23/00* (2006.01)
(52) U.S. Cl. .......................................... 701/38; 701/70
(58) Field of Classification Search ................. 701/36, 701/38, 34, 45, 70, 72, 75; 180/197; 280/5.502, 280/5.506; 303/146
See application file for complete search history.

(56) References Cited

U.S. PATENT DOCUMENTS

| 6,086,168 | A | 7/2000 | Rump |
| 6,438,463 | B1 | 8/2002 | Tobaru et al. |
| 6,694,226 | B1 | 2/2004 | Tobaru et al. |
| 6,904,350 | B1* | 6/2005 | Lu et al. ........................ 701/70 |
| 6,941,205 | B1* | 9/2005 | Hrovat et al. .................. 701/34 |
| 6,954,140 | B1* | 10/2005 | Holler ........................ 340/438 |
| 6,961,648 | B1* | 11/2005 | Salib et al. .................... 701/70 |
| 6,963,797 | B1* | 11/2005 | Salib et al. .................... 701/45 |
| 2002/0173882 | A1 | 11/2002 | Tobaru et al. |

FOREIGN PATENT DOCUMENTS

JP 2001-71787 3/2001

OTHER PUBLICATIONS

Masato Abe, "Vehicle Dynamics and Control", May 31, 1994, pp. 2-3 and 148-149, published by Sankaido Co. Ltd. (cited in the specification).

* cited by examiner

*Primary Examiner*—Richard M. Camby
(74) *Attorney, Agent, or Firm*—Buchanan Ingersoll PC

(57) ABSTRACT

A first state variable indicative of a rolling motion of a vehicle and a second state variable indicative of a different rolling motion of the vehicle from the first state variable are acquired. A roll increasing tendency of the vehicle is estimated on the basis of a characteristic including the second state variable. At least one of a braking force control and a driving force control is performed to restrain the roll increasing tendency of the vehicle, on the basis of the first state variable acquired when the roll increasing tendency is estimated.

11 Claims, 10 Drawing Sheets

FIG. 13

| OUTPUT (RESULT) | (Rot) | STATE VARIABLE INDICATIVE OF MAGNITUDE (Ram) | · ROLL ANGLE (Ra) |
|---|---|---|---|
| | | | · SUSPENTION STROKE (STxx) |
| | | STATE VARIABLE INDICATIVE OF VELOCITY (Rsp) | · ROLL VELOCITY (Rr) |
| | | | · SUSPENSION STROKE VELOCITY (dSTxx) |
| ROLL STATE VARIABLE (Rst) | | STATE VARIABLE INDICATIVE OF MAGNITUDE (ROLL INPUT MAGNITUDE) (Rm) | · STEERING WHEEL ANGLE ($\delta$sw) |
| | | | (→ESTIMATED LATERAL ACCELERATION (Gy2)) |
| | | | · WHEEL SLIP ANGLE ($\alpha$xx) |
| | | | · VEHICLE SLIP ANGLE ($\beta$) |
| | | | · YAW VELOCITY (Yr) |
| | | | (→ESTIMATED LATERAL ACCELERATION (Gy1)) |
| | | | · LATERAL ACCELERATION (Gy) |
| | | | · WHEEL LATERAL FORCE (SFxx) |
| | | | · INERTIA FORCE (Fy) |
| | | | · ROLLING MOMENT (Mx) |
| | | | · YAWING MOMENT (Ym) |
| INPUT (CAUSE) | (Rin) | STATE VARIABLE INDICATIVE OF VELOCITY (ROLL INPUT VELOCITY) (dRm) | · STEERING WHEEL ANGULAR VELOCITY (d$\delta$sw) |
| | | | (→VARIATION OF ESTIMATED LATERAL ACCELERATION (dGy2)) |
| | | | · WHEEL SLIP VELOCITY (d$\alpha$xx) |
| | | | · VEHICLE SLIP VELOCITY (d$\beta$) |
| | | | · YAW ACCELERATION (dYr) |
| | | | (→VARIATION OF ESTIMATED LATERAL ACCELERATION (dGy1)) |
| | | | · VARIATION OF LATERAL ACCELERATION (dGy) |
| | | | · VARIATION OF WHEEL LATERAL FORCE (dSFxx) |
| | | | · VARIATION OF INERTIA FORCE (dFy) |
| | | | · VARIATION OF ROLLING MOMENT (dMx) |
| | | | · VARIATION OF YAWING MOMENT (dYm) |

ROLLING MOTION STABILITY CONTROL
APPARATUS FOR A VEHICLE

This application claims priority under 35 U.S.C. Sec. 119 to No. 2005-124103 filed in Japan on Apr. 21, 2005, the entire content of which is herein incorporated by reference.

BACKGROUND OF THE INVENTION

1. Field of the Invention

The present invention relates to a rolling motion stability control apparatus for a vehicle, particularly relates to an apparatus for restraining a roll increasing tendency of the vehicle to stabilize the rolling motion.

2. Description of the Related Arts

In order to maintain a stability of a vehicle, there is known heretofore an apparatus for controlling a braking force applied to each wheel by means of a braking system, as disclosed in the U.S. Pat. No. 6,086,168, for example. In the United States patent, described is "For at least one vehicle-movement dynamics characteristic variable which is indicative of the tendency of the vehicle to tilt about the longitudinal axis, an associated tilting-prevention threshold value is prescribed. The respective characteristic-variable instantaneous value is acquired continuously and compared with the tilting-prevention threshold value. As soon as a characteristic-variable instantaneous value exceeds the associated tilting-prevention threshold value, the wheels which are on the outside during cornering are braked in order to prevent the vehicle tilting about the longitudinal axis of the vehicle." Also, it is described that the instantaneous values of vehicle-movement dynamics characteristic variables include variables such as the lateral acceleration, the change over time of the lateral acceleration, the attitude angle, the attitude-angle velocity, the change in the attitude-angle velocity over time and the slip angle. And, as a first embodiment of the method, it is proposed that the lateral acceleration is the only vehicle-movement dynamics characteristic variable. With respect to another embodiment, it is described that the lateral acceleration, the change in the lateral acceleration over time, the attitude angle, the attitude-angle velocity, the change in the attitude-angle velocity over time and the slip angle are used as vehicle-movement dynamics characteristic variables. And, it is described that if one or more characteristic variables exceed the associated threshold values, the vehicle-movement dynamics control system brakes the wheels which are on the outside during cornering, such that they are placed in a high slip state.

According to the method as described in the above United States patent, it focused on a vehicle behavior during cornering, which is a motion about a longitudinal axis of the vehicle, to be classified as a rolling motion in view of a vehicle motion control, as described in a book entitled "Vehicle Dynamics and Control" written by Masato Abe, and published by Sankaido Co. Ltd., on May 31, 1994. On Page 3 of that book, the rolling motion has been classified as a motion which is basically created by a steering operation, together with a lateral motion of the vehicle, and a yawing motion about a vertical axis of the vehicle. And, it is described on Page 148 of the book that if a rolling moment acts on the vehicle, a roll angle will be caused about a roll center.

In general, the roll angle has been employed as a factor indicative of the rolling motion of the vehicle, as described above. With respect to the roll angle, in Japanese Patent Laid-open Publication No. 2001-71787 and its English abstract of esp@cenet database, disclosed is a method proposed to improve the accuracy of deciding whether a vehicle is liable to roll over or not from its roll angle and roll angular velocity. It is described in the English abstract that with threshold lines plotted on a two-dimensional map employing parameters, or a vehicle roll angle and roll angular velocity, the hysteresis of the actual roll angle and roll angular velocity of the vehicle, when crossing either the threshold line from a non roll over region including the origin to a roll over region delimited away from the origin, shows that the vehicle is liable to roll over. According to the method as proposed in the above Japanese Publication, it is provided with a roll angular velocity sensor, which outputs the roll angular velocity, the integrated value of which is employed as a variation of the roll angle, and added to an initial value of the roll angle calculated on the basis of the output of a lateral acceleration sensor, thereby to obtain the roll angle. Then, it is described that the result determined whether there is a possibility of roll over of the vehicle can be used for controls for inflating an inflatable curtain, inflating a side air bag, extending a retractable roll over, or the like.

The method as proposed in the above Japanese Publication is applied to apparatuses which are adapted to perform the control for inflating the inflatable curtain or the like, in response to the result of determination based on the roll angle and roll angular velocity. Therefore, it is required to be capable of determining that the rolling motion of the vehicle has been excessive, to such an extent that vehicle passengers must be protected by inflating the inflatable curtain. On the contrary, it is not appropriate to inflate the inflatable curtain in such a state that the rolling motion of the vehicle is not so large. In contrast, when the rolling motion is determined for the stability control of the vehicle in the rolling motion, it is required to detect a slight rolling motion. Therefore, the method as described in the above Japanese Publication can not be applied to the determination of the rolling motion for the stability control of the vehicle according to the present invention.

In the U.S. patent as described before, it is described that a plurality of vehicle-movement dynamics characteristic variables such as the lateral acceleration, and explained is one embodiment that employs the lateral acceleration as the only dynamics characteristic variable, and the other one embodiment that employs one or more characteristic variables as the dynamics characteristic variables. With respect to the former embodiment, however, described is "as soon as the characteristic-variable instantaneous value exceeds the associated tilting-prevention threshold value", and with respect to the latter embodiment, described is "if one or more characteristic variables exceed the associated threshold values". Thus, it is a fundamental requisite in either embodiment that the characteristic variables are compared with the associated threshold values, respectively. Therefore, even if it was possible to apply the one or more characteristic variables to the method for determining the tendency of the vehicle to tilt about the longitudinal axis, as proposed in the above-described U.S. patent, it would not be possible to appropriately determine the rolling motion to be used in the vehicle motion stability control according to the present invention. Also, it is important to determine how a braking force control or a driving force control is to be continued, or to be terminated.

SUMMARY OF THE INVENTION

Accordingly, it is an object of the present invention to provide a rolling motion stability control apparatus for restraining a roll increasing tendency of a vehicle to stabilize a rolling motion thereof, which is capable of estimating a roll increasing tendency of a vehicle accurately, to continue at least one of a braking force control and a driving force control appropriately, and terminate the same appropriately.

In accomplishing the above and other objects, the rolling motion stability control apparatus includes a first state variable acquiring device for acquiring a first state variable indicative of a rolling motion of the vehicle, a second state variable acquiring device for acquiring a second state variable indicative of a different rolling motion of the vehicle from the first state variable acquired by the first state variable acquiring device, and a roll increasing tendency estimation device for estimating the roll increasing tendency of the vehicle, on the basis of a characteristic including the second state variable acquired by the second state variable acquiring device. A control device is provided for performing at least one of a braking force control and a driving force control of the vehicle, to restrain the roll increasing tendency of the vehicle. The control device is adapted to perform at least one of the braking force control and the driving force control, on the basis of the first state variable acquired by the first state variable acquiring device when the roll increasing tendency estimation device estimates the roll increasing tendency of the vehicle.

In the rolling motion stability control apparatus, the second state variable acquired by the second state variable acquiring device may be a state variable indicative of velocity of the rolling motion. And, the second state variable acquiring device may be adapted to calculate a steering angular velocity on the basis of a steering angle detected by a steering angle sensor in response to operation of a steering wheel of the vehicle, to be served as the second state variable. Or, the second state variable acquiring device may acquire a roll velocity of the vehicle detected by a roll velocity sensor, to be served as the second state variable.

As for the first state variable acquired by the first state variable acquiring device, it may be a state variable indicative of magnitude of the rolling motion. The first state variable acquiring device may acquire a lateral acceleration of the vehicle detected by a lateral acceleration sensor, to be served as the first state variable.

Preferably, the second state variable acquiring device is adapted to calculate a steering angular velocity on the basis of the steering angle detected by the steering angle sensor, to be served as the second state variable, and the first state variable acquiring device acquires the lateral acceleration detected by the lateral acceleration sensor, to be served as the first state variable, so that the roll increasing tendency estimation device estimates the roll increasing tendency of the vehicle, on the basis of a relationship between the steering angular velocity served as the second state variable, and the lateral acceleration served as the first state variable.

Or, the second state variable acquiring device acquires the roll velocity detected by the roll velocity sensor, to be served as the second state variable, and the first state variable acquiring device acquires the lateral acceleration detected by the lateral acceleration sensor, to be served as the first state variable, so that the roll increasing tendency estimation device estimates the roll increasing tendency of the vehicle, on the basis of a relationship between the roll velocity served as the second state variable, and the lateral acceleration served as the first state variable.

The apparatus as described above, may further include a third state variable acquiring device for acquiring a third state variable indicative of a rolling motion of the vehicle, and a reference modifying device for modifying a reference for controlling at least one of the braking force control and the driving force control of the vehicle by the control device, on the basis of the third state variable acquired by the third state variable acquiring device.

Preferably, the first state variable acquiring device acquires the lateral acceleration detected by the lateral acceleration sensor, to be served as the first state variable, and the control device is adapted to limit the reference, with at least one of an upper limit and a lower limit being provided for the lateral acceleration served as the first state variable.

The third state variable acquiring device may be adapted to calculate variation in time of the lateral acceleration on the basis of the lateral acceleration detected by the lateral acceleration sensor, to be served as the third state variable.

BRIEF DESCRIPTION OF THE DRAWINGS

The above stated object and following description will become readily apparent with reference to the accompanying drawings, wherein like referenced numerals denote like elements, and in which:

FIG. 13 is a table showing roll state variables indicative of inputs of rolling motion according to an embodiment of the present invention.

DESCRIPTION OF THE PREFERRED EMBODIMENTS

Figure 1:
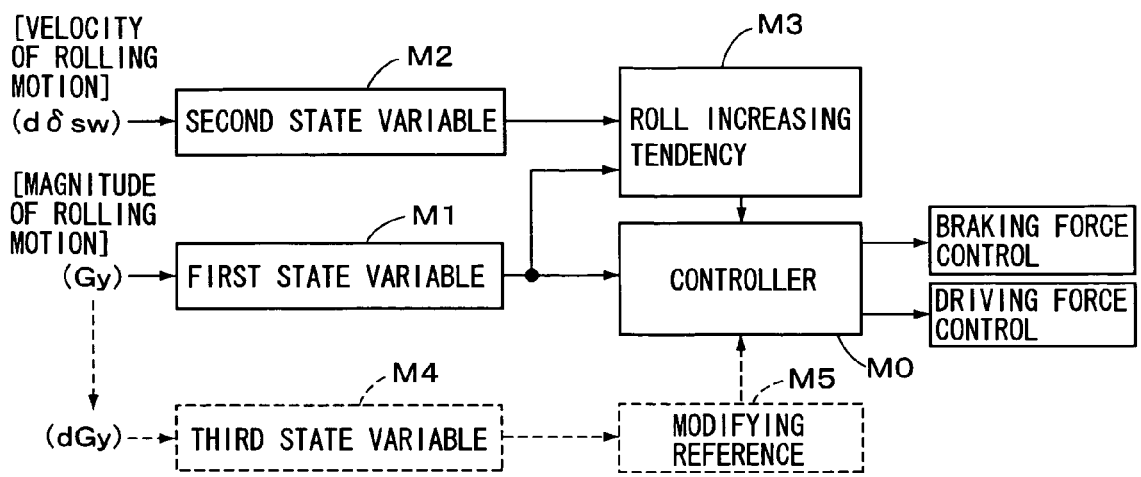
FIG. 1 is a schematic block diagram of a rolling motion stability control apparatus for a vehicle according to an embodiment of the present invention.

Referring to FIG. 1, there is schematically illustrated a rolling motion stability control apparatus for restraining a roll increasing tendency of a vehicle according to an embodiment of the present invention. The apparatus is provided with a first state variable acquiring device M1 which acquires a first state variable indicative of a rolling motion of the vehicle, a second state variable acquiring device M2 which acquires a second state variable indicative of a different rolling motion of the vehicle from the first state variable acquired by the first state variable acquiring device M1, and a roll increasing tendency estimation device M3 which estimates the roll increasing tendency of the vehicle, on the basis of a characteristic including the second state variable acquired by the second state variable acquiring device M2. A controller M0 is provided for performing at least one of a braking force control and a driving force control of the vehicle, to restrain the roll increasing tendency of the vehicle. And, the controller M0 is adapted to perform at least one of the braking force control and the driving force control, on the basis of the first state variable acquired when the roll increasing tendency estimation device M3 estimates the roll increasing tendency of the vehicle.

As for the second state variable as described above, a steering angular velocity (d$\delta$sw) may be employed for example, to serve as a state variable indicative of velocity of the rolling motion. As for the first state variable, a lateral acceleration (Gy) may be employed for example, to serve as a state variable indicative of magnitude of the rolling motion. On the basis of a relationship between the steering angular velocity (d$\delta$sw) and the lateral acceleration (Gy), the roll increasing tendency of the vehicle can be estimated appropriately, as will be described later in detail. Furthermore, as indicated by broken lines in FIG. 1, the apparatus may be provided with a third state variable acquiring device M4 which acquires a third state variable indicative of a rolling motion of the vehicle, and a reference modifying device M5 which modifies a reference for controlling at least one of the braking force control and the driving force control of the vehicle by the controller M0, on the basis of the third state variable. As for the third state variable, may be employed variation in time of the lateral acceleration (dGy), as will be described later in detail as well.

Next will be explained the roll increasing tendency of the vehicle according to the present invention. The roll increasing tendency may be classified as the one which is caused by a rapid rolling motion (hereinafter, referred to as dynamic roll increasing tendency), the one which is caused by a relatively gradual rolling motion (hereinafter, static roll increasing tendency), and the one which has an intermediate characteristic between the dynamic roll increasing tendency and the static roll increasing tendency (hereinafter, intermediate roll increasing tendency). The dynamic roll increasing tendency is caused, provided that, with the rapid steering operation or a reverse steering operation being made by a vehicle driver, the rolling motion is rapidly increased, so that a suspension member abuts on a bound stopper to be compressed, whereby a wheel, with the suspension member at a side thereof to be expanded, is forced to be lifted. In contrast, the static roll increasing tendency is caused in such a gradual rolling motion that the roll angle is gradually increased, while the roll velocity (corresponding to the roll angular velocity in the aforementioned English abstract) is small. This is resulted from mainly such a state that a gravity position of the vehicle has been placed to be high, with the number of passengers being increased, or with loading conditions being changed.

Figure 12:
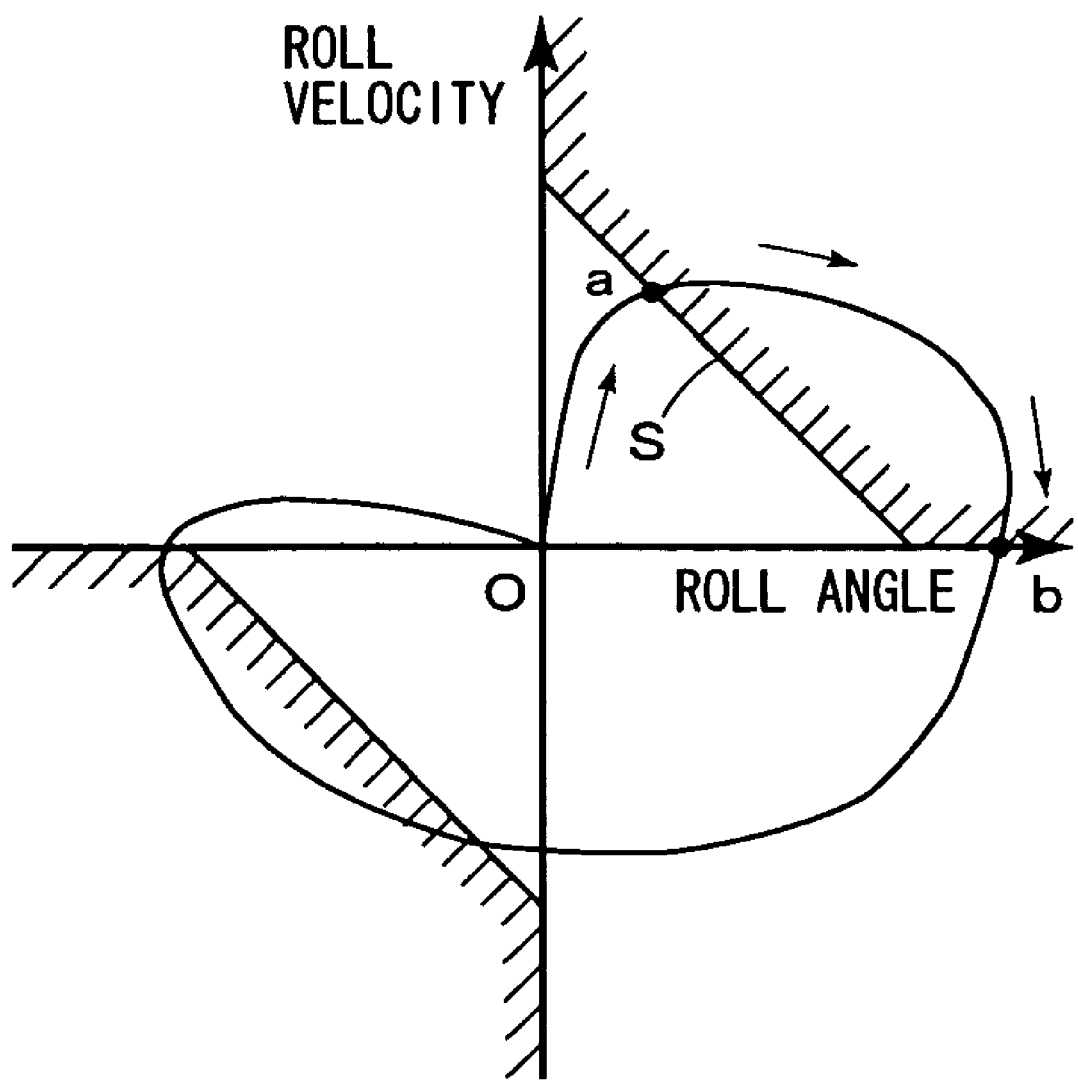
FIG. 12 is a diagram showing an example of operation using a control map according to a prior apparatus.

On the other hand, provided that the two-dimensional map employing the vehicle roll angle and roll (angular) velocity, as described in the aforementioned Japanese Publication (particularly, FIG. 3 in the Publication), is used to perform the braking force control, a vehicle state will vary to trace arrows as shown in FIG. 12, for example. That is, the vehicle state begins its straight moving from the origin (0), and produces the roll angle and roll velocity, which will cross a reference line (S) at a position (a), to begin the braking force control. According to the braking force control, the roll angle and roll velocity will be reduced to be out of the control zone at a position (b), thereby to terminate the braking force control. At the position (b), the braking force control is terminated, while it has not been reduced enough. In view of a view point of restraining the roll increasing tendency, a characteristic with the roll angle being as small as possible is desirable. In other words, it is preferable to continue the braking force control up to a zone with a relatively small roll angle.

Therefore, it is desirable to determine the start of the braking force control on the basis of the reference for estimating the roll increasing tendency of the vehicle, and provide a control reference on the basis of the vehicle state obtained when the start has been determined, to continue the braking force control according to the control reference, until terminating the control. That is, it is preferable to estimate the reference for estimating the roll increasing tendency, and perform the control, on the basis of different characteristics, respectively. According to the present embodiment, therefore, it is so constituted that the roll increasing tendency of the vehicle can be estimated accurately, and at least one of the braking force control and the driving force control can be performed, on the basis of the control reference provided for executing each of the controls (continuing and terminating the control) appropriately. With respect to characteristics of cornering or turning operation of the vehicle to the right or left thereof, they are generally indicated by a positive or negative reference, e.g., positive reference for the left turn, and negative reference for the right turn, which will require a very complicated explanation, if a relationship in magnitude of them is to be explained. Therefore, the relationship in magnitude of them will be explained by that of the absolute values of them, hereinafter, except for being specifically identified.

Figure 2:
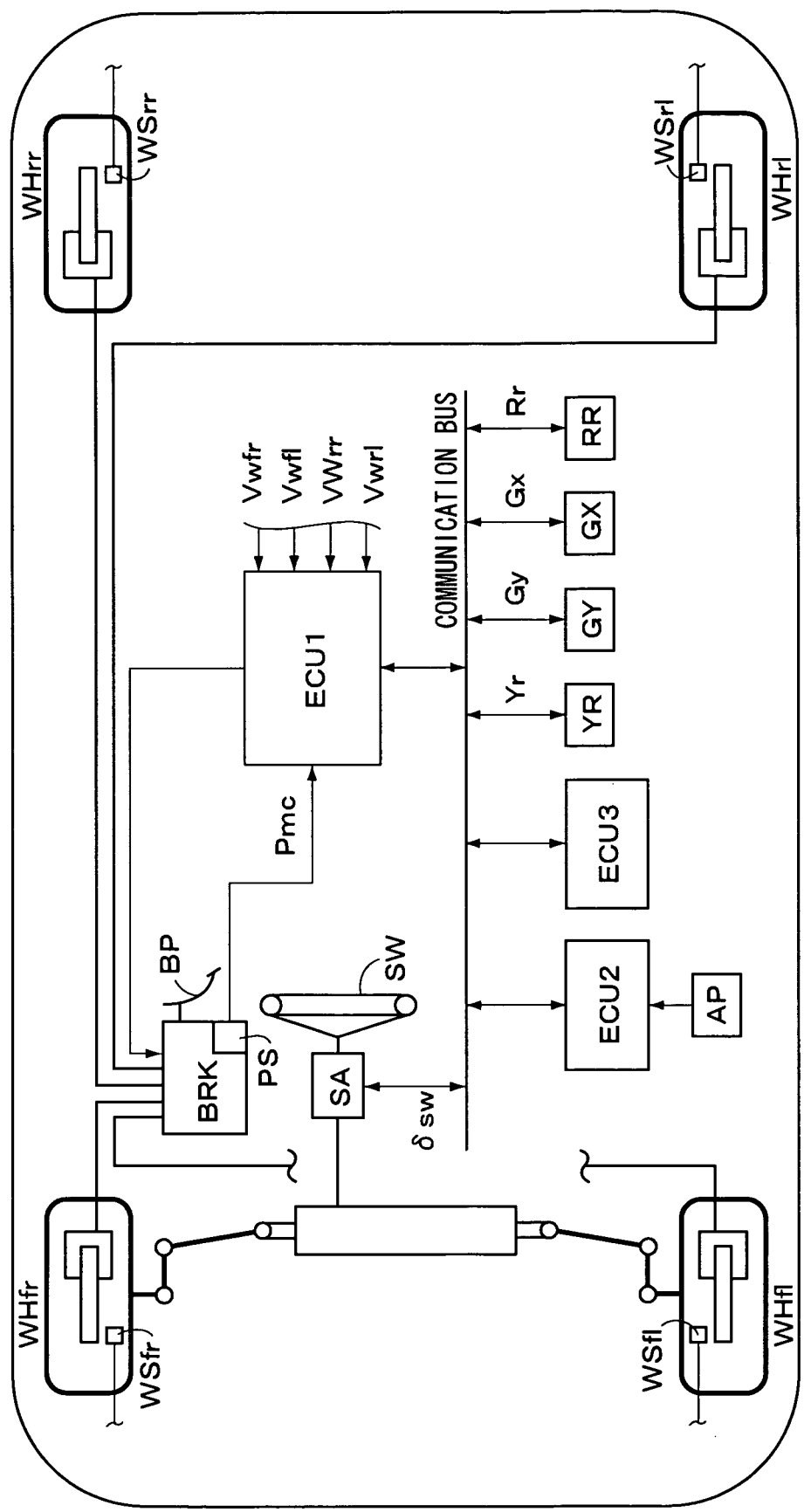
FIG. 2 is a schematic block diagram of a vehicle having a rolling motion stability control apparatus according to an embodiment of the present invention.

Referring to FIG. 2, there is schematically illustrated an overall structure of a vehicle with the rolling motion stability control apparatus according to an embodiment of the present invention. A brake system electronic control unit ECU1, engine system electronic control unit ECU2, and instrument panel electronic control unit ECU3 are connected to one another through a communication bus, so that the information for each control unit can be fed from other control units. Furthermore, there are provided a steering angle sensor SA for detecting the steering angle ($\delta$sw) of a steering wheel SW, a longitudinal acceleration sensor GX for detecting a vehicle longitudinal acceleration (Gx), a lateral acceleration sensor GY for detecting a vehicle lateral acceleration (Gy), a yaw rate sensor YR for detecting a yaw rate (Yr) of the vehicle and so on, which are electrically connected to each electronic control unit to supply thereto the sensor signals. A brake actuator BRK is provided for applying a braking force to each wheel in response to depression of a brake pedal BP of the vehicle driver, and controlling the braking force on each wheel independently in response to a signal from the electronic control unit ECU1, when the vehicle rolling motion stability control is required, as described later. A pressure sensor PS is provided in the brake actuator BRK for detecting an amount of operation of the brake pedal BP by the vehicle driver, to feed its detected pressure (Pmc) to the brake system electronic control unit ECU1. The braking force control for the rolling motion stability control can be performed, even in the case where the vehicle driver is not operating the brake pedal BP.

As shown in FIG. 2, at each wheel WHxx of the vehicle, there is provided a wheel speed sensor WSxx, which is connected to the electronic control unit ECU1. And, a signal having pulses proportional to a rotational speed of each wheel, i.e., a wheel speed signal is fed to the electronic control unit ECU1, wherein a vehicle speed (V) in the longitudinal direction of the vehicle is calculated on the basis of wheel speed signals (Vwxx) fed from the wheel speed sensors WSxx. The amount of operation (Ap) of an accelerator pedal (not shown) is detected by an accelerator pedal sensor AP, and fed to the electronic control unit ECU1 through the communication bus as described before.

According to the present embodiment, the vehicle rolling motion stability control is performed in the brake system electronic control unit ECU1. When the vehicle rolling motion stability control starts, the braking force applied to each wheel is controlled independently, so as to restrain the vehicle roll increasing tendency. Furthermore, signals for controlling the driving force applied to the wheel are fed to the engine system electronic control unit ECU2 through the communication bus, so as to reduce engine torque by controlling a throttle opening, ignition timing, amount of fuel to be injected and so on, and control the driving force applied to the wheel. At the same time, notification signals are fed to the instrument panel electronic control unit ECU3 through the communication bus, so as to actuate a visible or audible annunciator (not shown) for notifying the vehicle driver of the vehicle state.

Figure 3:
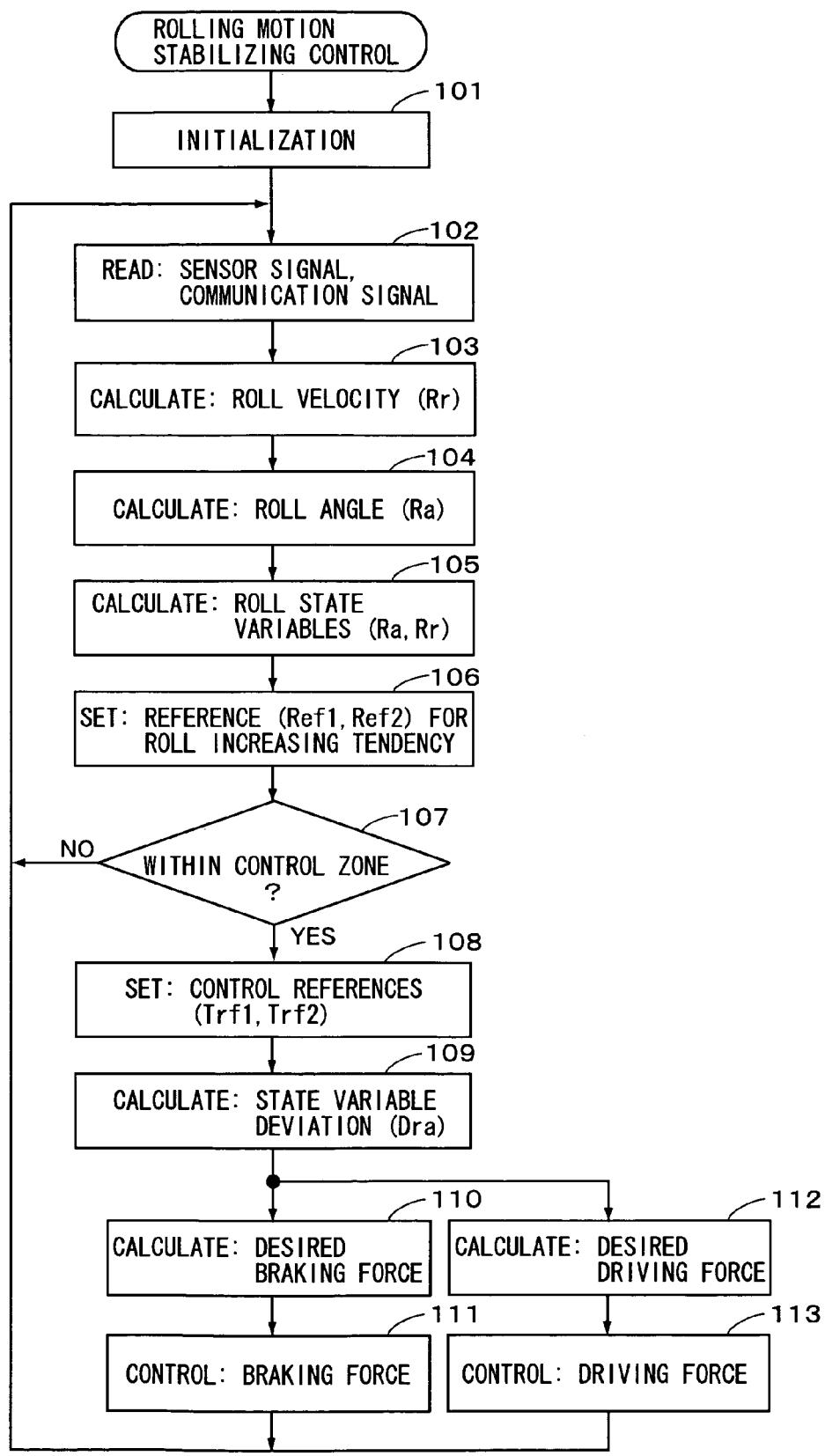
FIG. 3 is a flowchart for an example of a rolling motion stability control according to an embodiment of the present invention.

Referring to FIG. 3, the rolling motion stability control according to the present embodiment will be performed as follows. At the outset, the program provides for initialization of the system at Step 101, and the signals detected by various sensors and communication signals are read at Step 102. Then the program proceeds to Step 103, where the roll velocity (Rr) is calculated on the basis of the signal detected by the roll velocity sensor RR, and further proceeds to Step 104, where the roll velocity (Rr) is integrated to provide the roll angle (Ra) at Step 104. At Step 105, therefore, the state variable indicative of actual rolling motion, i.e., roll state variable, is indicated by (Ra, Rr), with the roll angle (Ra) and the roll velocity (Rr) being employed as variables. Next, reference characteristics for use in estimating the vehicle roll increasing tendency are set at Step 106, to provide references (Ref1 and Ref2) for estimating the roll increasing tendency. Then, it is determined at Step 107 whether the roll state variable (Ra, Rr) is within a control zone relative to the references (Ref1 and Ref2) for estimating the roll increasing tendency. In this respect, the control zone is a zone wherein the braking force control and driving force control are required to stabilize the rolling motion of the vehicle. If it is determined at Step 107 that the roll state variable (Ra, Rr) is outside the control zone relative to the reference (Ref1 and Ref2) for estimating the roll increasing tendency, the program returns to Step 102, without the braking force control and driving force control being performed. On the contrary, if it is determined that the roll state variable (Ra, Rr) is within the control zone, the program proceeds to Step 108, where control references (Trf1 and Trf2) for controlling the braking force control and driving force control are provided. Then, the state variable deviation (Dra) is calculated at Step 109 on the basis of the roll state variable (Ra, Rr) and the control references (Trf1 and Trf2).

Accordingly, the program proceeds to Step 110 where a desired braking force (BFdxx) is calculated for each wheel on the basis of the state variable deviation (Dra). And, the brake actuator BRK is controlled in response to the desired braking force (BFdxx) at Step 111. When the desired braking force (BFdxx) is calculated, may be considered the amount of operation of the brake pedal BP made by the vehicle driver, e.g., master cylinder pressure to be input as a detected pressure (Pmc). Likewise, a desired driving force is calculated at Step 112 on the basis of the state variable deviation (Dra), so that the amount of engine torque to be reduced is determined. Then, an engine system actuator (not shown) is actuated at Step 113 to control the throttle opening, ignition timing, amount of fuel to be injected and so on. When the desired driving force is calculated, may be considered the amount of operation of the accelerator pedal AP made by the vehicle driver.

Figure 4:
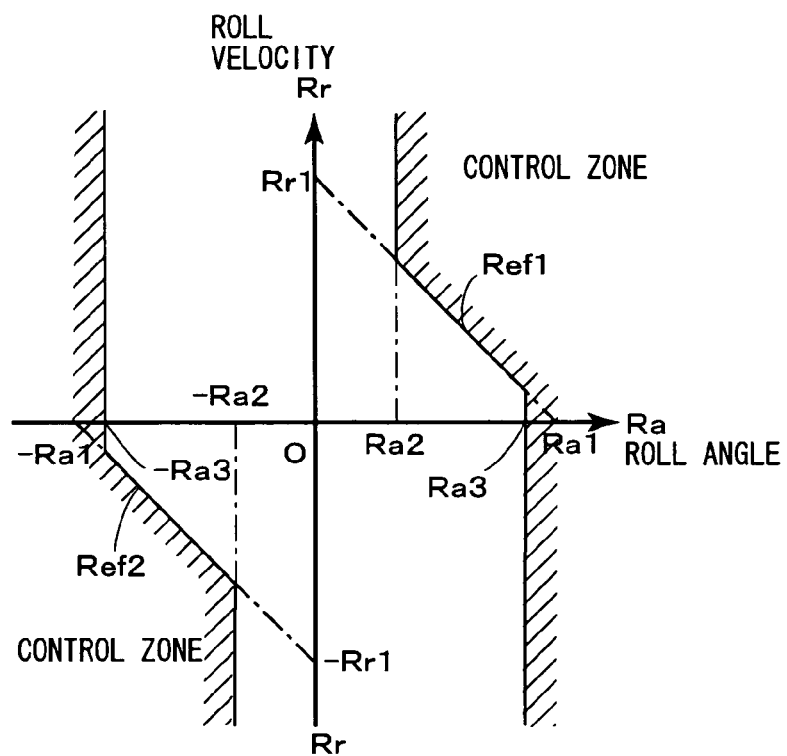
FIG. 4 is a diagram showing an example of a control map including a reference for estimating a roll increasing tendency according to an embodiment of the present invention.

Next, referring to FIG. 4, the references (Ref1 and Ref2) for estimating the roll increasing tendency to be used at Step 107 will be explained hereinafter. With respect to characteristics of cornering or turning operation of the vehicle, the characteristic of left turn can be provided to be symmetrical relative to the characteristic of right turn about the origin (0), so that the characteristic of left turn will be explained hereinafter. The reference characteristic for use in estimating the vehicle roll increasing tendency, i.e., the reference (Ref1) for estimating the roll increasing tendency is set by a two-dimensional relationship (two-dimensional map) with the roll angle (Ra) and roll velocity (Rr) being as variables. For example, it can be set according to a straight line function provided by the following equation (1):

$$Rr = -(Rr1/Ra1) \cdot Ra + Rr1 \qquad (1)$$

where Ra1 and Rr1 are constants for providing the references (Ref1 and Ref2) for estimating the roll increasing tendency, to be set in advance on the basis of the vehicle dimensions or the like. Or, Ra1 and Rr1 may be set according to vehicle states such as the vehicle speed, to provide the references (Ref1 and Ref2) for estimating the roll increasing tendency to be variable. Instead of the reference (Ref1) for estimating the roll increasing tendency with the straight line function, it may be set according to a combination of a plurality of straight line functions, or a curvilinear function. Or, without using the functions, a numerical map may be employed.

Thus, as the actual rolling motion is identified by a two-dimensional relationship with the roll angle (Ra) and roll velocity (Rr) being as variables, not only the dynamic roll increasing tendency and the static roll increasing tendency, but also the intermediate roll increasing tendency can be estimated appropriately. Furthermore, a lower limit (Ra2) may be provided to avoid unnecessary estimation when running on a relatively low coefficient of friction road, so that if the roll angle (Ra) is smaller than the lower limit (Ra2), the estimation of the roll increasing tendency shall not be made. Also, an upper limit (Ra3) may be provided for the roll angle (Ra), so that if the roll angle (Ra) is equal to or greater than the upper limit (Ra3), the estimation of the roll increasing tendency shall be made certainly.

Figure 5:
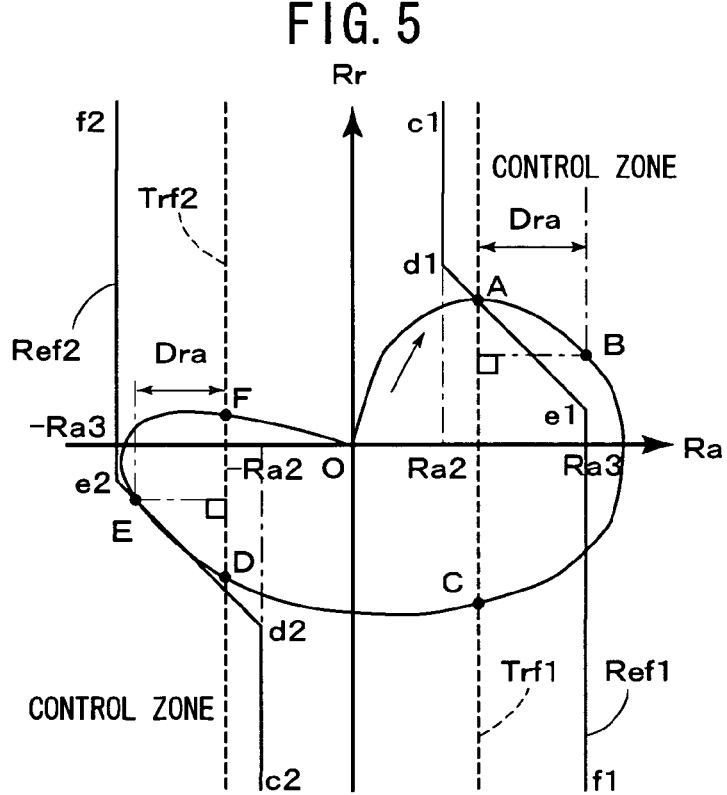
FIG. 5 is a diagram showing an example of operation using the control map as shown in FIG. 4, according to an embodiment of the present invention.

Next, referring to FIG. 5, will be explained determination of the state variable being fallen in the control zone, provision of control references (Trf1 and Trf2) and calculation of the state variable deviation (Dra), which are made at Steps 107–109, respectively. With respect to the control references (Trf1 and Trf2), when an initial turning operation of the vehicle (hereinafter, referred to as first turning operation) is performed, provided are the control references for the first turning operation, on the basis of which the control references are provided for a next turning operation (hereinafter, referred to as second turning operation). Hereinafter, will be explained when the vehicle is turned to the left at first. When the vehicle is turned to the right, the order for providing the control references is reversed. In the case where the vehicle is moving straight, the roll angle (Ra) and roll velocity (Rr) have not been created, to be placed in the origin (0) in FIG. 5. Then, the vehicle begins to perform the first turning operation (left turn in FIG. 5), and initiate the rolling operation, thereby to increase the roll angle (Ra) and roll velocity (Rr). When the roll state variable (Ra, Rr) crosses the reference (Ref1) for estimating the roll increasing tendency, i.e., characteristic of (c1–d1–e1–f1) in FIG. 5, in a direction to be increased, at a point (A) in FIG. 5, it is determined at Step 107 that the state variable has been fallen in the control zone. On the other hand, at Step 108, the roll angle (Ra), which is obtained when the roll state variable (Ra, Rr) crosses the reference (Ref1) for estimating the roll increasing tendency, in a direction to be increased, is used to provide the control reference (Trf1) for the first turning operation (left turn), as indicated by a broken line in FIG. 5. Then, the control reference (Trf2) for the second turning operation (right turn) is provided to be symmetrical relative to the control reference (Trf1) about the origin (0), as indicated by a broken line in FIG. 5. Also, at Step 109, a deviation between the roll angle (Ra) of the roll state variable (Ra, Rr) and the control reference (Trf1) is calculated to provide the state variable deviation (Dra). The state variable deviation obtained at a point (B) in FIG. 5 is calculated from a normal distance extending vertically from the roll angle at the point (B) to the control reference (Trf1), to provide the state variable deviation (Dra). Then, the state variable deviation for the second turning operation is obtained as the deviation against the control reference (Trf2) for the second turning operation. And, the state variable deviation obtained at a point (E) in FIG. 5 is calculated from a normal distance extending vertically from the roll angle at the point (E) to the control reference (Trf2), to provide the state variable deviation (Dra).

With respect to the determination whether the roll state variable has been fallen within the control zone in case of the first turning operation, it is made on the basis of the relationship between the roll state variable and the reference (Ref1) for estimating the roll increasing tendency. However, if once the roll state variable is fallen within the control zone, to provide the control references (Trf1 and Trf2), the determination will be made thereafter on the basis of the control references (Trf1 and Trf2). That is, it is determined that the roll state variable has been out of the control zone, if the roll state variable crosses the control reference (Trf1) in a direction to be decreased, i.e., the roll angle is decreased to be smaller than the control reference (Trf1), at a point (C) in FIG. 5. Thus, the references for estimating the roll increasing tendency have been modified to provide the control reference (as indicated by broken lines), which are different from the references for estimating the roll increasing tendency (as indicated by solid lines). Therefore, the braking force control and driving force control will be terminated, after the roll angle has been decreased sufficiently. As a result, the control effect can be achieved certainly. With respect to the determination whether the roll state variable has been fallen within the control zone in case of the second turning operation, it is determined whether the roll state variable crosses the control reference (Trf2) in a direction to be increased, at a point (D) in FIG. 5. Therefore, it is determined that the roll state variable has been out of the control zone, if the roll state variable crosses the control reference (Trf2) in a direction to be decreased, in the same manner as the first turning operation, at a point (F) in FIG. 5. Although FIG. 5 shows a case where the roll state variable of the vehicle crosses a line segment (d1–e1) in the reference (Ref1) for estimating the roll increasing tendency, there may be a case where the roll state variable crosses a line segment (c1–d1). In the latter case, the control reference (Trf1) is set to be of a characteristic extending the line segment (c1–d1). And, the control reference (Trf2) for the second turning operation is set to be of a characteristic extending the line segment (c2–d2).

Figure 6:
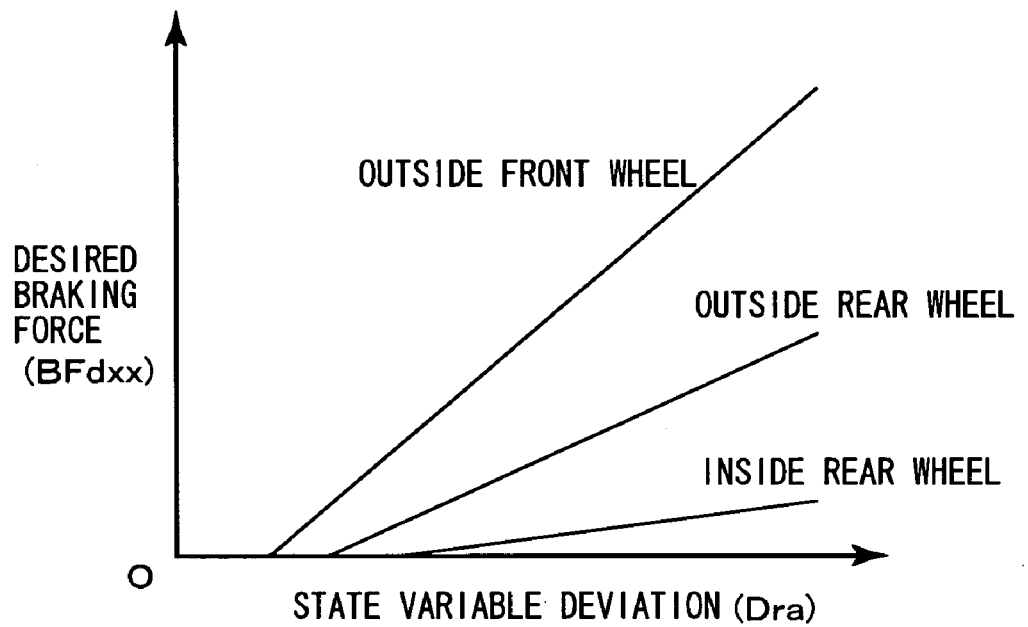
FIG. 6 is a diagram showing an example of a map for calculating a desired braking force provided for each wheel of a front wheel located on the outside of a curve during cornering operation of a vehicle, a rear wheel located on the outside of the curve, and a rear wheel located on the inside of the curve, on the basis of a state variable deviation, according to an embodiment of the present invention.

The desired braking force (BFdxx) obtained at Step 110 in FIG. 3 is calculated on the basis of the state variable deviation (Dra) obtained at Step 109, to provide the desired braking force (BFdxx) for each wheel as shown in FIG. 6. That is, in order to restrain the roll increasing tendency of the vehicle with an appropriate yawing moment being maintained, calculated is the desired braking force (BFdxx) for each wheel of a front wheel located on the outside of a curve in the vehicle's path during cornering operation of the vehicle, a rear wheel located on the outside of the curve, and rear wheel located on the inside of the curve, on the basis of the state variable deviation. Thus, the braking force control is executed in response to the state variable deviation, such that if the rolling motion is very severe with respect to the roll increasing tendency of the vehicle, relatively strong braking force will be applied to restrain the roll increasing tendency. On the contrary, if the state variable deviation is relatively small, while the roll increasing tendency of the vehicle has been found, minimal braking force will be applied to stabilize the roll increasing tendency. In order to reduce the vehicle speed rapidly, with the appropriate yawing moment being maintained, one wheel or plurality of wheels may be selected as the wheel to be controlled. For example, it is effective to apply the braking force to all of four wheels, one wheel of the front wheel located on the outside of the curve during cornering operation of the vehicle, two front wheels and the rear wheel located on the inside of the curve, or two front wheels and the rear wheel located on the outside of the curve.

According to the above-described embodiment, the roll increasing tendency is estimated on the basis of the roll angle (Ra) and roll velocity (Rr) as variables, which are the state variables resulted from the rolling motion (i.e., outputs), so that detection means such as a roll velocity sensor or the like. Instead of the outputs of the rolling motion such as roll angle (Ra) and roll velocity (Rr), the roll increasing tendency can be estimated, by the state variables indicative of inputs of the rolling motion, i.e., input state variable (Rin). Furthermore, as well known heretofore is such an apparatus that is adapted to perform a control for stabilizing the yawing motion of the vehicle through a braking force control and a driving force control, and called as an Electronic Stability Control (abbreviated as ESC), it is beneficial in cost to use components of the yawing motion stability control apparatus, in the rolling motion stability control apparatus, as well. According to the following embodiment, therefore, will be explained such an embodiment that the roll increasing tendency is estimated by the state variables obtained in response to magnitude and velocity of the inputs of the rolling motion, which will cause the rolling motion, so that the stability control of the rolling motion will be achieved.

As for the state variables indicative of the inputs of the rolling motion, i.e., input state variable (Rin), there are a roll input magnitude (Rm) indicative of magnitude of the input of the rolling motion, and a roll input velocity (dRm) indicative of velocity of the input of the rolling motion. The static roll increasing tendency can be estimated appropriately by the roll input magnitude (Rm), and the dynamic roll increasing tendency can be estimated appropriately by the roll input velocity (dRm). Therefore, the roll increasing tendency is estimated according to the two-dimensional relationship, with the roll input magnitude (Rm) and roll input velocity (dRm) being as variables, so as to estimate any of the static roll increasing tendency, dynamic roll increasing tendency, and intermediate roll increasing tendency.

Figure 7:
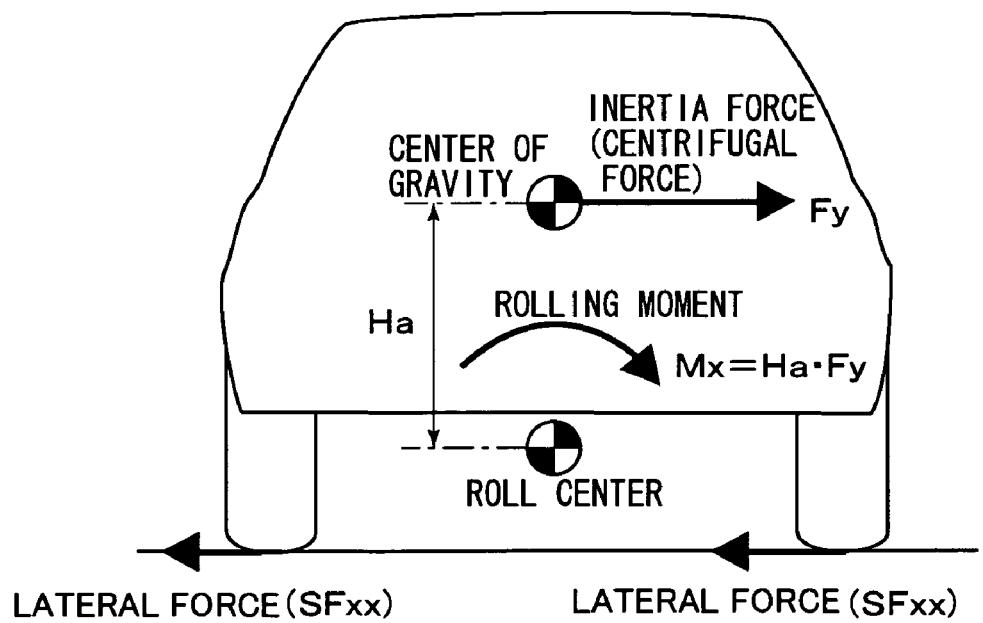
FIG. 7 is a diagram showing a relationship among state variables provided in a rolling motion of an ordinary vehicle.
Figure 8:
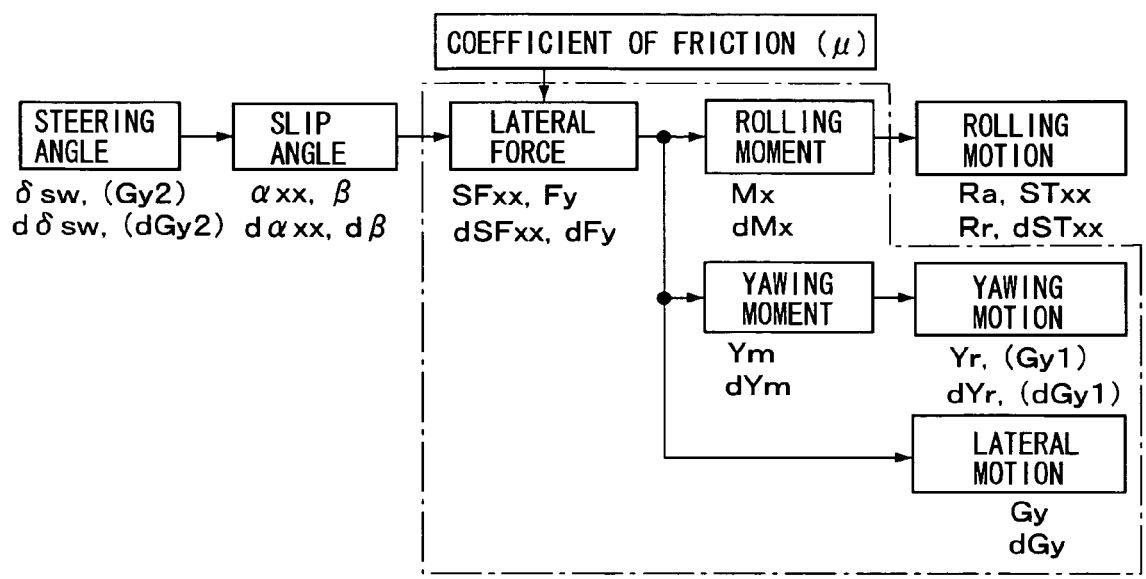
FIG. 8 is a block diagram showing state variables indicative of inputs of rolling motion of a vehicle according to the present invention.

Referring to FIGS. 7 and 8, will be explained the state variables of the vehicle rolling motion. When a steering wheel (not shown) is operated by a vehicle driver, the vehicle is turned, with a slip angle (αxx) produced on each wheel, and a lateral force (SFxx) produced on each wheel, wherein "xx" designates each wheel, i.e., "fr" designates the wheel at the front right side as viewed from the position of a driver's seat, "fl" designates the wheel at the front left side, "rr" designates the wheel at the rear right side, and "rl" designates the wheel at the rear left side. In this case, an inertia force (centrifugal force) (Fy) acts on the gravity center of the vehicle, to balance with the lateral force produced on the wheel. However, the gravity center of the vehicle is not placed on the same position as the center of the rolling motion (i.e., roll center), so that there is a distance (Ha) between the gravity center and the roll center, to produce a rolling moment (Mx), i.e., (Mx)=(Ha)·(Fy). As a result, the rolling motion of the vehicle is created by the rolling moment, and if the rolling motion is excessive, it can be estimated that the vehicle is in the roll increasing tendency.

On the basis of the rolling motion dynamics as described above, a roll state variable (Rst) indicative of the rolling motion can be classified into an output state variable (Rot) indicative of an output (result) of the rolling motion, and an input state variable (Rin) indicative of an input (cause) of the rolling motion. As for the output state variable (Rot) relating to the output of the rolling motion, the roll angle (Ra) and roll velocity (Rr) are included. In view of movement of a suspension (not shown), a suspension stroke STxx and its velocity dSTxx are included, as well. Next, as for the input state variable (Rin) indicative of the input of the rolling motion, included are the steering wheel angle (δsw) of the steering wheel SW and steering wheel angular velocity (dδsw), wheel slip angle (αxx) and its velocity (dαxx), vehicle slip angle (β) and its velocity (dβ), wheel lateral angle (SFxx) and its variation in time (dSFxx), vehicle inertia force (Fy) and its variation in time (dFy), and further rolling moment (Mx) of the direct input of the rolling motion, and its variation in time (dMx). As the inertia force (the sum of lateral force for all wheels) corresponds to the vehicle lateral acceleration, a vehicle lateral acceleration (Gy) detected by a lateral acceleration sensor GY (described later) and its variation in time (dGy) can be included in the input state variable (Rin). Also, as the lateral force produces a yawing motion of the vehicle, a yawing moment (Ym) and its variation in time (dYm), yaw velocity (Yr) and its variation in time (yaw acceleration) (dYr) can be employed as the input state variable (Rin) of the rolling motion.

In this case, as the lateral acceleration of the vehicle can be indicated by other state variables, according to equations as described hereinafter, they may be used for the input state variable (Rin). First of all, an estimated lateral acceleration (Gy1) obtained by the yaw velocity (Yr) can be calculated according to the following equation (2):

$$Gy1 = V \cdot Yr \quad (2)$$

where "V" is a vehicle speed.

Likewise, a variation in time (dGy1) of the estimated lateral acceleration (Gy1) can be calculated according to the following equation (3):

$$dGy1 = V \cdot dYr \quad (3)$$

where "dYr" is a variation in time of the yaw velocity (Yr), i.e., yaw acceleration.

Then, an estimated lateral acceleration (Gy2) obtained by the steering wheel angle (δsw) can be calculated according to the following equation (4):

$$Gy2 = [V^2/\{L(1+Kh \cdot V^2)\}] \cdot (\delta sw/N) \quad (4)$$

where "L" is a wheel base, "Kh" is a stability factor, and "N" is a steering gear ratio.

Or, if Kh=0 (neutral steering) is used, the estimated lateral acceleration (Gy2) can be calculated according to the following equation (4'):

$$Gy2 = (V^2/L) \cdot (\delta sw/N) \quad (4')$$

Likewise, a variation in time (dGy2) of the estimated lateral acceleration (Gy2) can be calculated according to the following equation (5):

$$dGy2 = [V^2/\{L(1+Kh \cdot V^2)\}] \cdot (d\delta sw/N) \quad (5)$$

where "dδsw" is a steering wheel angular velocity. Or, if Kh=0 (neutral steering) is used, the estimated lateral acceleration (Gy2) can be calculated according to the following equation (5'):

$$dGy2 = (V^2/L) \cdot (d\delta sw/N) \quad (5')$$

The roll state variable (Rst) indicative of the rolling motion as described above is classified as shown in FIG. 13, wherein the roll state variables are classified into the output (result) and input (cause), and wherein the roll input magnitude (Ram, Rm) indicative of magnitude of the input of the rolling motion, and the roll input velocity (Rsp, dRm) indicative of velocity of the input of the rolling motion are classified, separately. In FIG. 13, the state variables following an arrow as indicated in parentheses are those obtained through the calculations.

Figure 9:
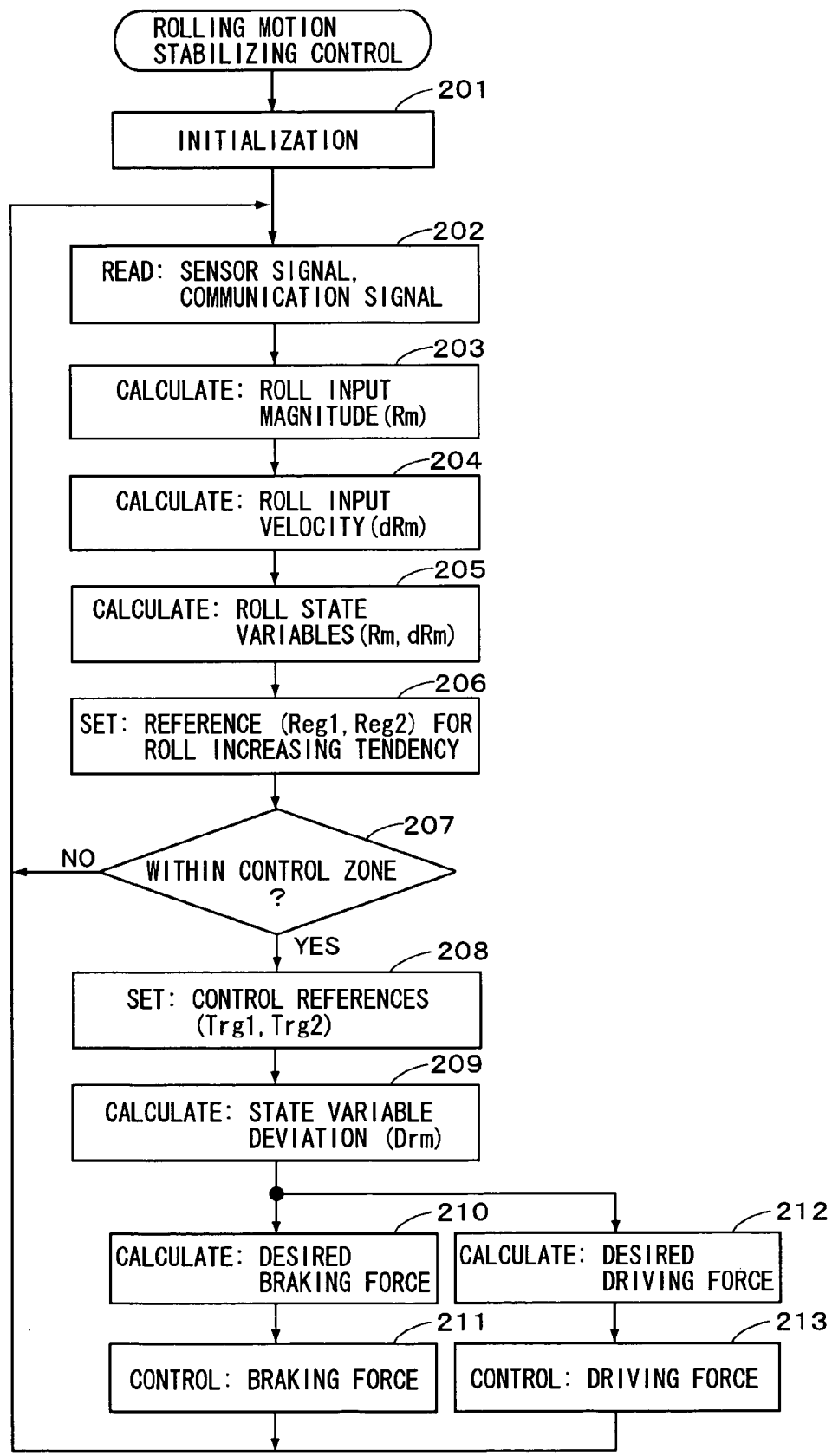
FIG. 9 is a flowchart for an example of a rolling motion stability control according to another embodiment of the present invention.

The vehicle rolling motion stability control apparatus of the embodiment as described above is constituted in the same manner as shown in FIG. 2, to operate according to a flowchart as shown in FIG. 9. At the outset, the program provides for initialization of the system at Step 201, and the signals detected by various sensors and communication signals are read at Step 202. Then the program proceeds to Step 203, where the roll input magnitude (Rm) indicative of magnitude of the input of the rolling motion is calculated, and further proceeds to Step 204, where the roll input velocity (dRm) indicative of velocity of the input of the rolling motion is calculated. The roll input magnitude (Rm) and roll input velocity (dRm) are the state variables as shown in FIG. 13, each of which can be calculated by known methods. At Step 205, therefore, the state variable indicative of actual rolling motion, i.e., roll state variable, is indicated by (Rm, dRm), with the roll input magnitude (Rm) and the roll input velocity (dRm) being employed as variables.

Next, reference characteristics for use in estimating the vehicle roll increasing tendency are set at Step 206, to provide references (Reg1 and Reg2) for estimating the roll increasing tendency. Then, it is determined at Step 207 whether the roll state variable (Rm, dRm) is within a control zone relative to the references (Reg1 and Reg2) for estimating the roll increasing tendency. The references (Reg1 and Reg2) are set in advance on the basis of the vehicle dimensions or the like, or may be set according to vehicle states such as the vehicle speed. Furthermore, a lower limit (Rm1) and an upper limit (Rm2) may be provided, in the same manner as shown in FIG. 4. If it is determined at Step 207 that the roll state variable (Rm, dRm) is outside the control zone relative to the reference (Reg1 or Reg2) for estimating the roll increasing tendency, the program returns to Step 202, without the braking force control and driving force control being performed. On the contrary, if it is determined that the roll state variable (Rm, dRm) is within the control zone, the program proceeds to Step 208, where control references (Trg1 and Trg2) for controlling the braking force control and driving force control are provided. Then, the state variable deviation (Drm) is calculated at Step 209 on the basis of the roll input magnitude (Rm) and the control references (Trg1 and Trg2).

Accordingly, the program proceeds to Step 210 where a desired braking force (BFdxx) is calculated for each wheel on the basis of the state variable deviation (Drm). And, the brake actuator BRK is controlled in response to the desired braking force (BFdxx) at Step 211. Likewise, a desired driving force is calculated at Step 212 on the basis of the state variable deviation (Drm), so that the amount of engine torque to be reduced is determined. Then, an engine system actuator (not shown) is actuated at Step 213 to control the throttle opening, ignition timing, amount of fuel to be injected and so on.

Figure 10:
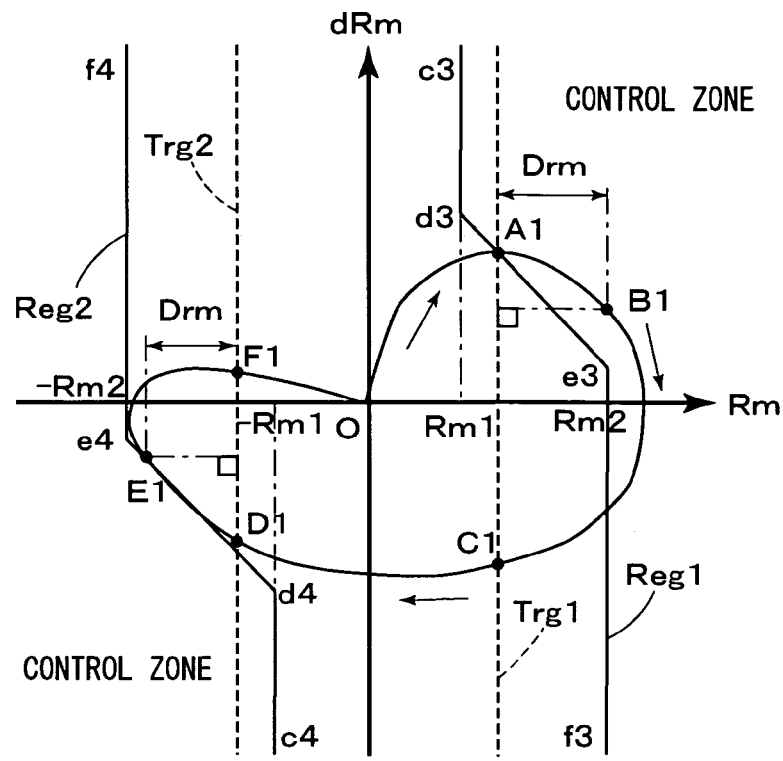
FIG. 10 is a diagram showing an example of operation using a control map according to another embodiment of the present invention.

Next, referring to FIG. 10, will be explained determination of the state variable being fallen in the control zone, provision of control references (Trg1 and Trg2) and calculation of the state variable deviation (Drm) which are made at Steps 207–209, respectively. With respect to the control references, they are set in the same manner as explained with reference to FIG. 5, wherein the control references for the first turning operation are provided, on the basis of which the control references are provided for the second turning operation. Hereinafter, will be explained when the vehicle is turned to the left at first. When the vehicle is turned to the right, the order for providing the control references is reversed. In the case where the vehicle is moving straight and will turn to the left (first turning operation), the roll state variable (Rm, dRm) is moved from the origin (0) in a direction as indicated by an arrow. When the roll state variable crosses the reference (Reg1) for estimating the roll increasing tendency, i.e., characteristic of (c3–d3–e3–f3) in FIG. 10, in a direction to be increased, it is determined to be fallen in the control zone. On the other hand, the roll input magnitude (Rm), which is obtained when the roll state variable crosses the reference (Reg1) for estimating the roll increasing tendency, in a direction to be increased, is used to provide the control reference (Trg1) for the first turning operation. Then, the control reference (Trg2) for the second turning operation is provided to be symmetrical relative to the control reference (Trg1) about the origin (0).

At Step 209, the state variable deviation is calculated on the basis of the control references (Trg1 and Trg2). The braking force control and driving force control for the first turning operation will be terminated, when the state variable crosses the control reference (Trg1) in a direction to be decreased. And, the initiation and termination of the control for the second turning operation will be executed, when the state variable crosses the control reference (Trg2) in a direction to be increased and decreased, respectively. Thus, the roll increasing tendency of the vehicle is estimated, or determined to be within the control zone, according to the two-dimensional relationship, with the roll input magnitude (Rm) and roll input velocity (dRm) being as variables, whereby the roll increasing tendency of the vehicle can be estimated certainly. After the roll increasing tendency has been estimated, the termination of the control or the like is determined according the control references, which are provided to be different from the references for estimating the roll increasing tendency. Therefore, the control can be continued, until the rolling motion will be reduced certainly.

In order to respond the dynamic roll increasing tendency, it is advantageous to employ the state variable obtained as early as possible. Therefore, it is desirable to use the state variable obtained on the basis of the steering angle (δsw) of the steering wheel SW, which is the first input of the rolling motion, out of the plurality of state variables as shown in FIG. 8. That is, the steering angular velocity (d sw), or variation in time (dGy2) of the estimated lateral acceleration calculated from the steering angle (δsw) is appropriate for the roll input velocity (dRm). When estimating the roll increasing tendency of the vehicle, not only the early estimation but also certain estimation based on the road surface condition are required. Therefore, it is desirable for the roll input magnitude (Rm) to use the state variables reflecting the result from a road coefficient of friction (μ), which include the lateral acceleration (Gy), yaw velocity (Yr), or the state variable obtained thereby. These are the state variables indicative of the vehicle behavior in a lateral direction or yaw direction, which are resulted from the lateral force created on each wheel, as apparent from the fact that the state variables are classified in such a region as shown at the right side from lateral force in FIG. 8.

The lateral acceleration (Gy), yaw velocity (Yr), and the state variable provided thereby are the state variables, which are resulted from operation of the steering wheel SW, but which are obtained later in time than the state variables obtained on the basis of the steering angle (δsw) of the steering wheel SW. However, they reflect the road surface condition, to provide a certain and robust state variable, and they are effective for a relatively gradual vehicle behavior such as the static roll increasing tendency. Therefore, the state variables obtained by the vehicle behavior in a lateral direction or yaw direction, which reflects the result from the road coefficient of friction (μ), may be used for the roll input magnitude (Rm), to achieve a certain and robust estimation of the roll increasing tendency.

Accordingly, it is desirable in the flowchart as shown in FIG. 9 that the state variable (lateral acceleration (Gy), yaw velocity (Yr), or estimated lateral acceleration (Gy1) calculated on the basis of the yaw velocity), which are affected by the road coefficient of friction (μ), may be used for the roll input magnitude (Rm), and the state variable (steering angular velocity (dδw), or variation in time of the estimated lateral acceleration (dGy2) calculated on the basis of the steering angle), which are obtained on the basis of the steering angle (δsw) of the steering wheel SW, may be used for the roll input velocity (dRm), in combination with the former state variable. As a result, the dynamic roll increasing tendency can be estimated appropriately by the state variable obtained on the basis of the steering angle (δsw), and the static roll increasing tendency can be estimated appropriately by the state variable obtained on the basis of the state variable affected by the road coefficient of friction ($\mu$), respectively. Furthermore, the intermediate roll increasing tendency can be estimated appropriately by the state variable obtained on the basis of the two-dimensional relationship, with the roll input magnitude (Rm) and roll input velocity (dRm) being as variables. With the rolling motion stability control being performed on the basis of the roll input magnitude (Rm) affected by the road coefficient of friction ($\mu$), the braking force control and driving force control can be continued or terminated, appropriately.

According to the embodiments as described above, two roll state variables have been employed to estimate the roll increasing tendency, and the rolling motion stability control is performed, with either one of the roll state variables used for estimating the roll increasing tendency, being employed as the control reference. However, the present invention is not limited to that embodiment, but may provide the apparatus for estimating the roll increasing tendency on the basis of the characteristic appropriate for estimating the roll increasing tendency, and performing the braking force control and driving force control on the basis of the characteristic appropriate for continuing the controls, which may be different from the former characteristic. Therefore, it may be so constituted to estimate the roll increasing tendency on the basis of the characteristic including at least one of the state variables as shown in FIG. 8, and perform the braking force control and driving force control on the basis of the state variable which was not used for estimating the roll increasing tendency. For example, the roll increasing tendency may be estimated on the basis of a relationship (characteristic) between the roll angle and roll velocity, and the rolling motion stability control may be performed, on the basis of the lateral acceleration obtained when the roll increasing tendency was estimated. Or, the roll increasing tendency may be estimated on the basis of the roll velocity, and the rolling motion stability control may be performed, on the basis of the lateral acceleration obtained when the roll increasing tendency was estimated.

Figure 11:
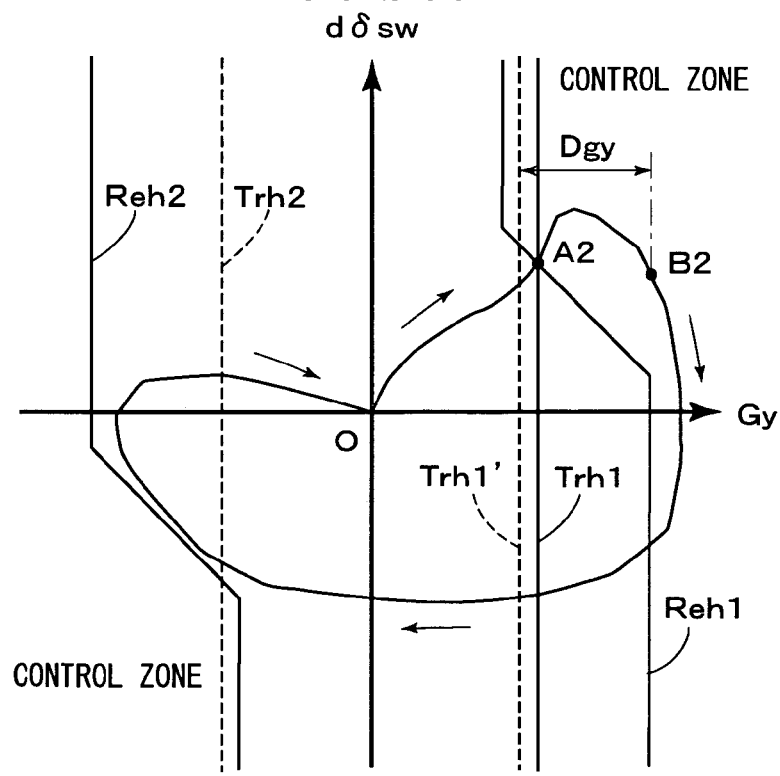
FIG. 11 is a diagram showing an example of operation using a control map according to a further embodiment of the present invention.

Furthermore, when the control references are provided, they may be modified by other state variables. FIG. 11 shows a map for use in estimating the roll increasing tendency, on the basis of the lateral acceleration (Gy) as the roll input magnitude, and the steering angular velocity (dδsw) as the roll input velocity. Hereinafter will be explained an operation performed in the case where the steering wheel SW was rapidly steered to be rotated further, during a cornering operation of the vehicle, as indicated by a region near a point (A2) in FIG. 11. According to the embodiment as described above, the lateral acceleration, which is obtained when the roll state variable crosses a reference (Reh1) for estimating the roll increasing tendency, in a direction to be increased, is used to provide a control reference (Trh1) as shown in FIG. 11. According to the present embodiment, other state variable such as a variation in time (dGy) of the lateral acceleration obtained in that case, is used as a third state variable to modify the control reference (Trh1) into a control reference (Trh1') as indicated by a broken line in FIG. 11. For example, when the variation in time (dGy) of the lateral acceleration is larger than a predetermined value, the control reference (Trh1) is modified to be reduced, to provide the control reference (Trh1'). Therefore, a state variable deviation (Dgy) between the actual roll state variable and the control reference is increased, to apply a relatively greater braking force to the wheels, so as to stabilize the rolling motion of the vehicle, until the lateral acceleration will be reduced to be relatively smaller. As a result, even in the case where the roll increasing tendency is likely to be accelerated by the rapid steering operation by the vehicle driver to rotate the steering wheel further, the roll increasing tendency of the vehicle will be restrained certainly. As for the third state variable, yaw acceleration (dYr) and variation in time (dGy1 or dGy2) of the estimated lateral acceleration may be used as the third state variable.

It should be apparent to one skilled in the art that the above-described embodiment are merely illustrative of but a few of the many possible specific embodiments of the present invention. Numerous and various other arrangements can be readily devised by those skilled in the art without departing from the spirit and scope of the invention as defined in the following claims.

What is claimed is:

1. A rolling motion stability control apparatus for restraining a roll increasing tendency of a vehicle to stabilize a rolling motion thereof, comprising:

first state variable acquiring means for acquiring a first state variable indicative of a rolling motion of said vehicle;

second state variable acquiring means for acquiring a second state variable indicative of a different rolling motion of said vehicle from the first state variable acquired by said first state variable acquiring means;

roll increasing tendency estimation means for estimating the roll increasing tendency of said vehicle, on the basis of a characteristic including the second state variable acquired by said second state variable acquiring means; and control means for performing at least one of a braking force control and a driving force control of said vehicle, to restrain the roll increasing tendency of said vehicle, said control means performing at least one of the braking force control and the driving force control, on the basis of the first state variable acquired by said first state variable acquiring means when said roll increasing tendency estimation means estimates the roll increasing tendency of said vehicle.

2. A rolling motion stability control apparatus as set forth in claim 1, wherein the second state variable acquired by said second state variable acquiring means is a state variable indicative of velocity of the rolling motion.

3. A rolling motion stability control apparatus as set forth in claim 2, further comprising a steering angle sensor for detecting a steering angle in response to operation of a steering wheel of said vehicle, wherein said second state variable acquiring means is adapted to calculate a steering angular velocity on the basis of the steering angle detected by said steering angle sensor, to be served as the second state variable.

4. A rolling motion stability control apparatus as set forth in claim 2, further comprising a roll velocity sensor for detecting a roll velocity of said vehicle, wherein said second state variable acquiring means acquires the roll velocity detected by said roll velocity sensor, to be served as the second state variable.

5. A rolling motion stability control apparatus as set forth in claim 1, wherein the first state variable acquired by said first state variable acquiring means is a state variable indicative of magnitude of the rolling motion.

6. A rolling motion stability control apparatus as set forth in claim 5, further comprising a lateral acceleration sensor for detecting a lateral acceleration of said vehicle, wherein said first state variable acquiring means acquires the lateral acceleration detected by said lateral acceleration sensor, to be served as the first state variable.

7. A rolling motion stability control apparatus as set forth in claim 1, further comprising a steering angle sensor for detecting a steering angle in response to operation of a steering wheel of said vehicle, and a lateral acceleration sensor for detecting a lateral acceleration of said vehicle, wherein said second state variable acquiring means is adapted to calculate a steering angular velocity on the basis of the steering angle detected by said steering angle sensor, to be served as the second state variable, and said first state variable acquiring means acquires the lateral acceleration detected by said lateral acceleration sensor, to be served as the first state variable, and wherein said roll increasing tendency estimation means estimates the roll increasing tendency of said vehicle, on the basis of a relationship between the steering angular velocity served as the second state variable, and the lateral acceleration served as the first state variable.

8. A rolling motion stability control apparatus as set forth in claim 1, further comprising a roll velocity sensor for detecting a roll velocity of said vehicle, and a lateral acceleration sensor for detecting a lateral acceleration of said vehicle, wherein said second state variable acquiring means acquires the roll velocity detected by said roll velocity sensor, to be served as the second state variable, and said first state variable acquiring means acquires the lateral acceleration detected by said lateral acceleration sensor, to be served as the first state variable, and wherein said roll increasing tendency estimation means estimates the roll increasing tendency of said vehicle, on the basis of a relationship between the roll velocity served as the second state variable, and the lateral acceleration served as the first state variable.

9. A rolling motion stability control apparatus as set forth in claim 1, further comprising:
   third state variable acquiring means for acquiring a third state variable indicative of a rolling motion of said vehicle; and
   reference modifying means for modifying a reference for controlling at least one of the braking force control and the driving force control of said vehicle by said control means, on the basis of the third state variable acquired by said third state variable acquiring means.

10. A vehicle motion stability control apparatus as set forth in claim 9, further comprising a lateral acceleration sensor for detecting a lateral acceleration of said vehicle, wherein said first state variable acquiring means acquires the lateral acceleration detected by said lateral acceleration sensor, to be served as the first state variable, and wherein said control means is adapted to limit the reference, with at least one of an upper limit and a lower limit being provided for the lateral acceleration served as the first state variable.

11. A rolling motion stability control apparatus as set forth in claim 9, further comprising a lateral acceleration sensor for detecting a lateral acceleration of said vehicle, wherein said third state variable acquiring means is adapted to calculate variation in time of the lateral acceleration on the basis of the lateral acceleration detected by said lateral acceleration sensor, to be served as the third state variable.

* * * * *